US 10,044,883 B2

(12) United States Patent
Matsumoto et al.

(10) Patent No.: US 10,044,883 B2
(45) Date of Patent: Aug. 7, 2018

(54) IMAGE FORMING APPARATUS

(71) Applicant: CANON KABUSHIKI KAISHA, Tokyo (JP)

(72) Inventors: Hiroshi Matsumoto, Toride (JP); Ryou Sakaguchi, Toride (JP); Shinnosuke Iwadate, Toride (JP); Teruhito Kai, Kashiwa (JP); Hiroto Nishihara, Tsukuba (JP); Hiromi Shimura, Toride (JP); Keita Takahashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/373,098

(22) Filed: Dec. 8, 2016

(65) Prior Publication Data
US 2017/0187898 A1 Jun. 29, 2017

(30) Foreign Application Priority Data

Dec. 24, 2015 (JP) ................................. 2015-251690

(51) Int. Cl.
G06K 15/00 (2006.01)
H04N 1/40 (2006.01)
(Continued)

(52) U.S. Cl.
CPC ..... H04N 1/00408 (2013.01); G06K 15/1823 (2013.01); H04N 1/00477 (2013.01);
(Continued)

(58) Field of Classification Search
CPC .. H04N 1/00408; H04N 1/00477; H04N 1/06; H04N 1/6027; H04N 1/62; H04N 2201/0094; G06K 15/1823
(Continued)

(56) References Cited

U.S. PATENT DOCUMENTS 8,576,427 B2  11/2013  Sakai
8,605,306 B2  12/2013  Takahashi
(Continued)

FOREIGN PATENT DOCUMENTS

JP    2007-114289    5/2007

OTHER PUBLICATIONS

U.S. Appl. No. 15/377,433, filed Dec. 13, 2016.

Primary Examiner — Quang N Vo
(74) Attorney, Agent, or Firm — Fitzpatrick, Cella, Harper & Scinto

(57) ABSTRACT

An image forming apparatus includes an image forming unit, an adjustment unit to select a type of adjustment processing for the image forming unit, a determination unit to determine a required time of the selected type of adjustment processing, and a display unit counting down and displaying a remaining time of the selected type of adjustment processing. The display unit controls a resolution of the remaining time based on the selected type of adjustment processing. A first type of adjustment processing is executed again if the first type of adjustment processing fails, and a second type of adjustment processing is not executed again if the second type of adjustment processing fails. The resolution includes a first resolution corresponding to the first type of adjustment processing and a second resolution corresponding to the second type of adjustment processing and being finer than the first resolution.

7 Claims, 7 Drawing Sheets

(51) Int. Cl.
  *H04N 1/00* (2006.01)
  *H04N 1/06* (2006.01)
  *H04N 1/62* (2006.01)
  *H04N 1/60* (2006.01)
  *G06K 15/02* (2006.01)
  *H04N 1/50* (2006.01)

(52) U.S. Cl.
  CPC ............ *H04N 1/06* (2013.01); *H04N 1/6027* (2013.01); *H04N 1/62* (2013.01); *H04N 1/506* (2013.01); *H04N 1/6036* (2013.01); *H04N 2201/0094* (2013.01)

(58) Field of Classification Search
  USPC .......................................... 358/2.1, 1.9, 1.15
  See application file for complete search history.

(56) References Cited

U.S. PATENT DOCUMENTS

| | | | |
|---|---|---|---|
| 2012/0062925 A1* | 3/2012 | Nakamura | ............ G03G 15/55 358/1.13 |
| 2015/0237225 A1* | 8/2015 | Tanaka | ............... H04N 1/00413 358/1.9 |
| 2016/0012320 A1 | 1/2016 | Takahashi | |
| 2016/0342124 A1 | 11/2016 | Iwadate | |

\* cited by examiner

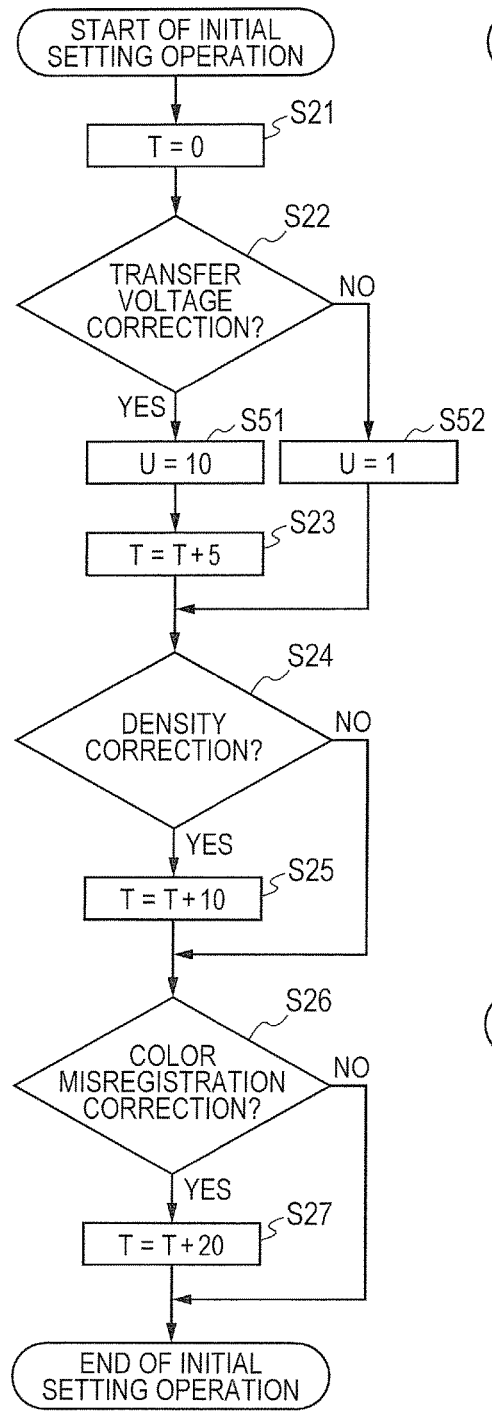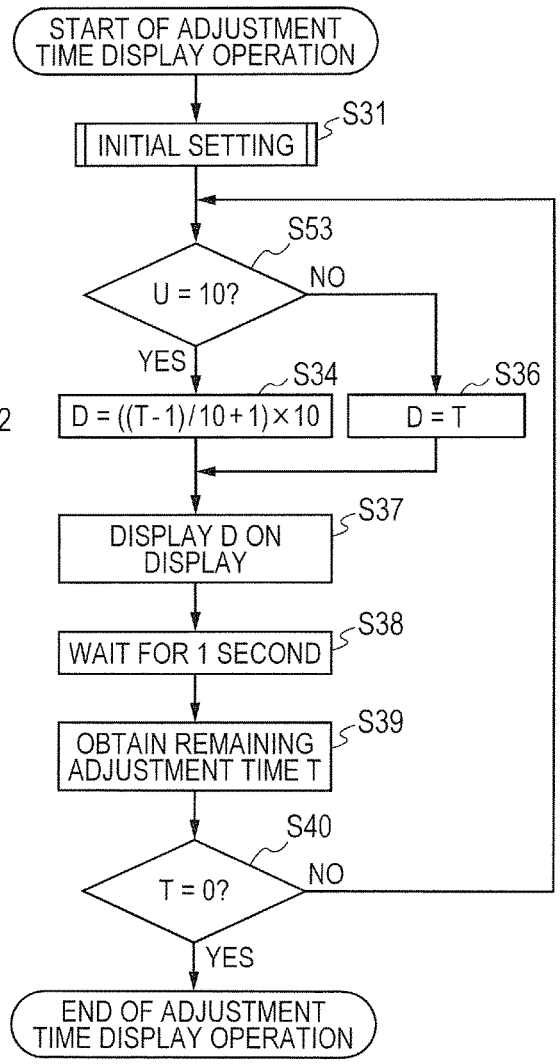
FIG. 7A
FIG. 7B

IMAGE FORMING APPARATUS

BACKGROUND OF THE INVENTION

Field of the Invention

The present invention relates to an image forming apparatus configured to form an image on a recording medium.

Description of the Related Art

Hitherto, in an image forming apparatus, e.g., a copying machine or a printer, a time required for a print job is displayed in order to predict a time at which a user can obtain a printed product and predict a time at which the image forming apparatus becomes available next. Further, in the image forming apparatus, e.g., a copying machine or a printer, an image quality adjustment operation is conducted while an image is not being formed in order to maintain satisfactory image quality.

In Japanese Patent Application Laid-Open No. 2007-114289, the above-mentioned time required for the print job is displayed by including a time for conducting the image quality adjustment operation while being counted down, to thereby improve accuracy of the time required for the print job to be displayed.

Hitherto, a required time defined in advance for each type of image quality adjustment has been used in order to display a displayed required time for the image quality adjustment (remaining time). When a correct result is not obtained in the image quality adjustment, a readjustment for executing the image quality adjustment again (hereinafter referred to as "retry operation") may be executed. Hitherto, both when a retry operation is conducted for an image quality adjustment operation and when a retry operation is not conducted for an image quality adjustment operation, the displayed required time obtained from the required time defined in advance is displayed by being counted down with the same unit time. However, in an actual case, image formation may not be restarted until a given longer time has elapsed although a remaining time counted down from the displayed required time with the same unit time is estimated to have become zero when a retry operation is conducted. This leads to a problem in that it is difficult for the user to estimate the timing at which an output product can be collected from the displayed required time after the image quality adjustment is started.

SUMMARY OF THE INVENTION

Therefore, the present invention provides an image forming apparatus configured to change a resolution of a displayed required time based on a type of an image quality adjustment.

According to one embodiment of the present invention, there is provided an image forming apparatus, comprising:
an image forming unit configured to form an image on a sheet;
an adjustment unit configured to select a type of adjustment processing to be executed for the image forming unit from among a plurality of types of adjustment processing, and to execute the selected type of adjustment processing for the image forming unit;
a determination unit configured to determine a required time of the selected type of adjustment processing; and
a display unit configured to display a remaining time to be taken until the selected type of adjustment processing finishes being executed based on the required time, wherein the display unit counts down the remaining time, and wherein the display unit controls a resolution of the remaining time based on the selected type of adjustment processing.

Further features of the present invention will become apparent from the following description of exemplary embodiments with reference to the attached drawings.

BRIEF DESCRIPTION OF THE DRAWINGS

FIGS. 7A and 7B are flowcharts for each illustrating a display operation of the image quality adjustment time according to a third embodiment of the present invention executed by the CPU.

DESCRIPTION OF THE EMBODIMENTS

Now, embodiments for carrying out the present invention will be described with reference to the accompanying drawings.

[First Embodiment]

(Image Forming Apparatus)

Figure 1:
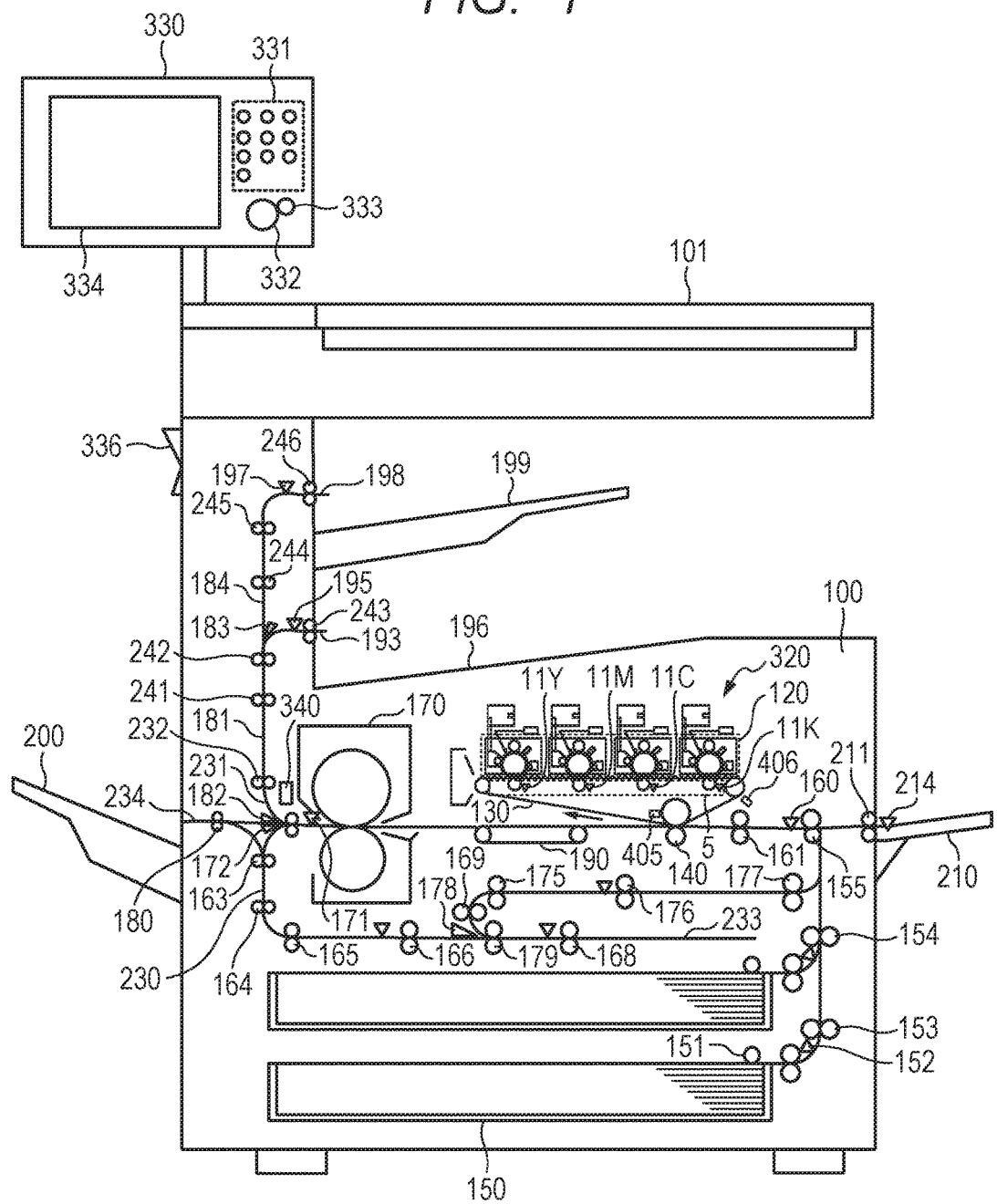
FIG. 1 is a sectional view of an image forming apparatus.

FIG. 1 is a sectional view of an image forming apparatus 100. The image forming apparatus 100 includes an image reading portion (scanner portion) 101 and a user interface (hereinafter referred to as "UI") 330 in a top part of the image forming apparatus 100. The image forming apparatus 100 is an electrophotographic color copying machine configured to form a color image on a recording medium (hereinafter referred to as "sheet") through use of toners of a plurality of colors.

Figure 2:
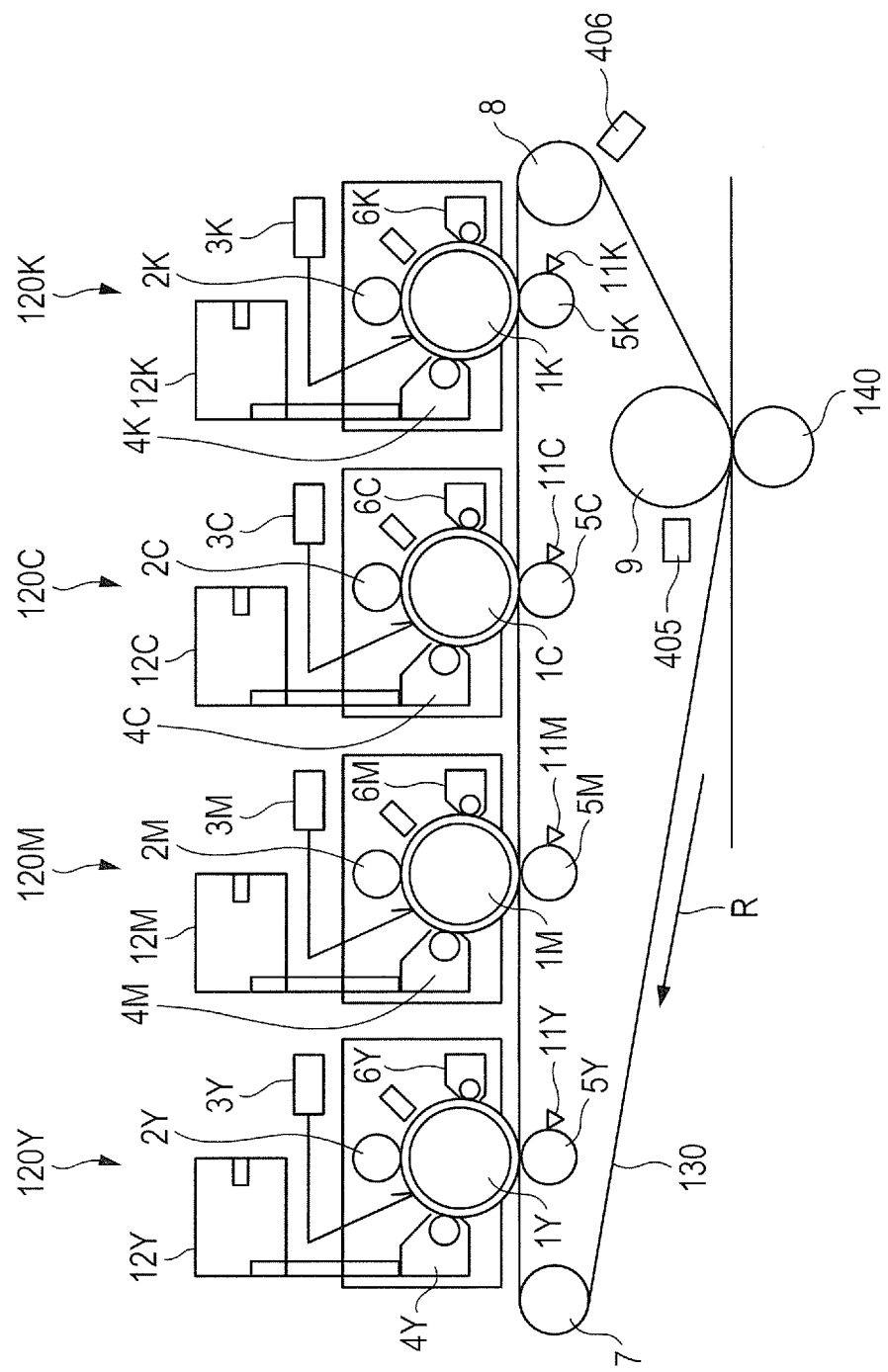
FIG. 2 is a view for illustrating an image forming portion of the image forming apparatus.

FIG. 2 is a view for illustrating an image forming portion (image forming unit) 320 of the image forming apparatus 100. The image forming portion 320 includes four process units 120 (120Y, 120M, 120C, and 120K). The process unit 120Y is configured to form a yellow image through use of a yellow toner. The process unit 120M is configured to form a magenta image through use of a magenta toner. The process unit 120C is configured to form a cyan image through use of a cyan toner. The process unit 120K is configured to form a black image through use of a black toner. The four process units 120 have the same structure except for the colors of developers (toners). Hence, unless otherwise necessary, the letters Y, M, C, and K are omitted from the reference symbols in the following description.

The process unit 120 includes a photosensitive drum (image bearing member) 1 serving as a photosensitive member. A charging device 2, a light scanning device (laser scanner unit) 3, a developing device 4, a primary transfer device 5, and a cleaning device 6 are arranged around the photosensitive drum 1. A developer container 12 is configured to supply a developer (toner) to the developing device 4. An endless intermediate transfer belt (intermediate transfer member) 130 is arranged below the photosensitive drum 1.

The intermediate transfer belt 130 is looped around a drive roller 7 and driven rollers 8 and 9. The intermediate transfer belt 130 is rotated toward a direction indicated by an arrow R during image formation. The primary transfer device 5 is arranged so as to be opposed to the photosensitive drum 1 across the intermediate transfer belt 130. The primary transfer device 5 is configured to transfer a toner image on the photosensitive drum 1 onto the intermediate transfer belt 130.

A patch sensor (density detection device and color misregistration detection device) 406 configured to detect a patch image for density correction and a pattern image for color misregistration correction that are transferred onto the intermediate transfer belt 130 is provided in the vicinity of the intermediate transfer belt 130. The patch sensor 406 detects the predetermined pattern image for the color misregistration correction in each color. A misregistration amount of the toner image in each color transferred onto the intermediate transfer belt 130 is obtained based on a result of the detection. The patch sensor 406 detects the predetermined patch image for the density correction in each color. A density of the toner image in each color transferred onto the intermediate transfer belt 130 is obtained based on a result of the detection.

A secondary transfer portion (secondary transfer roller) 140 is arranged so as to be opposed to the driven roller 9 across the intermediate transfer belt 130. The primary transfer devices 5Y, 5M, 5C, and 5K include transfer voltage sensors 11Y, 11M, 11C, and 11K, respectively. The transfer voltage sensors 11Y, 11M, 11C, and 11K are configured to detect primary transfer voltages applied to the primary transfer devices 5Y, 5M, 5C, and 5K, respectively. The image forming apparatus 100 includes an environmental sensor 405 configured to detect a temperature and a humidity in an inside of the image forming apparatus 100.

Figure 3:
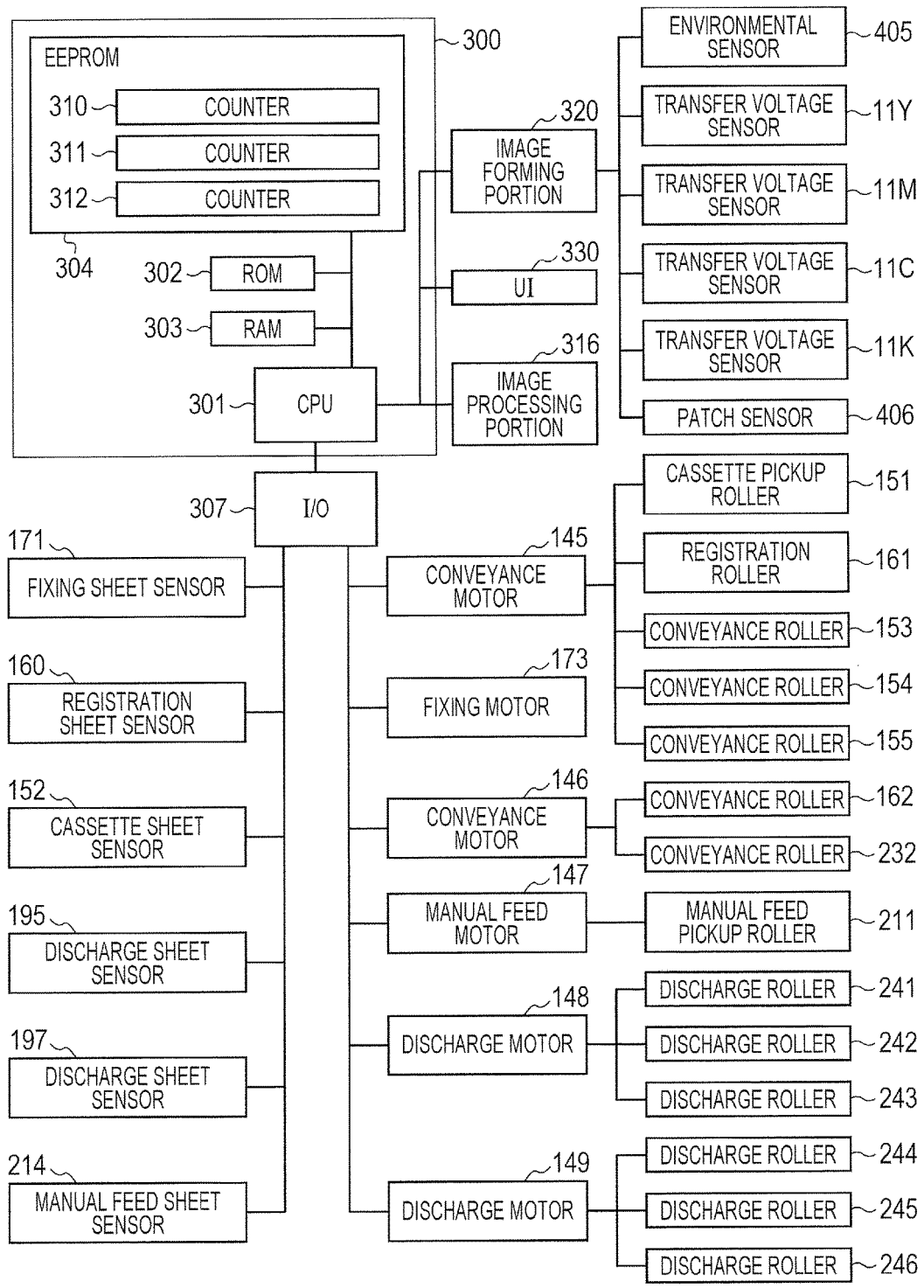
FIG. 3 is a block diagram for illustrating a control system of the image forming apparatus.

FIG. 3 is a block diagram for illustrating a control system of the image forming apparatus 100. A control unit 300 includes a CPU (controller) 301, a ROM (storage portion) 302, a RAM (storage portion) 303, and an EEPROM (non-volatile memory) 304. The control unit 300 is electrically connected to the UI 330 serving as an operation portion configured to allow a user to input various operation instructions. The CPU 301 is capable of communicating to/from the UI 330. When an instruction (hereinafter referred to as "job") to, for example, start an image forming operation is input from the UI 330 to the CPU 301, the CPU 301 starts the image forming operation.

The CPU 301 is configured to control a conveyance motor 145, a fixing motor 173, a conveyance motor 146, a manual feed motor 147, a discharge motor 148, and a discharge motor 149 through I/O (input/output device) 307. The CPU 301 is further configured to detect a signal received from each of a fixing sheet sensor 171, a registration sheet sensor 160, a cassette sheet sensor 152, a discharge sheet sensor 195, a discharge sheet sensor 197, and a manual feed sheet sensor 214 through the I/O 307.

The CPU 301 is capable of communicating to/from an image processing portion 316 configured to process an image corresponding to a content of the job received from the UI 330. The image processing portion 316 bidirectionally communicates to/from the CPU 301 to execute image processing including extraction and rotation of an image. The CPU 301 is configured to control the image forming portion 320. The image forming portion 320 controls the supply of a high voltage to the process unit 120, the intermediate transfer belt 130, and the secondary transfer portion 140, controls the driving of those components, and controls the light scanning device (exposure device) 3. The CPU 301 detects, via the image forming portion 320, a signal received from each of the transfer voltage sensors 11Y, 11M, 11C, and 11K included in the primary transfer device 5, and detects an application state of a transfer voltage applied to the primary transfer device 5 based on the detected signal. The CPU 301 detects a temperature and a humidity in the vicinity of the process unit 120 based on a signal received from the environmental sensor 405. The CPU 301 detects a surface state of the intermediate transfer belt 130 based on a signal received from the patch sensor 406. The image forming portion 320 controls a temperature of a heater of a fixing device 170. When executing copying, the image reading portion 101 reads an image of an original, and transmits image data on the image to the image processing portion 316.

The UI 330 serving as the operation portion includes an input key group 331 to be used when the user inputs information and a start key 332 to be pressed for starting the image forming operation. The UI 330 further includes a stop key 333 to be pressed for suspending the image forming operation and a display (display unit) 334 serving as a display unit for displaying a state of the image forming apparatus 100.

(Image Forming Operation)

Next, the image forming operation of the image forming apparatus 100 is described with reference to FIG. 1, FIG. 2, and FIG. 3. When receiving the job from the UI 330, the CPU 301 starts the image forming operation based on the received job. The CPU 301 drives the conveyance motor 145, which serves as a driving source of a cassette pickup roller 151, through the I/O 307 to rotate the cassette pickup roller 151, and feeds sheets inside the sheet feeding cassette 150 one by one. At this time, the CPU 301 determines whether or not a sheet feeding operation has been conducted normally based on a detection signal of the cassette sheet sensor 152.

A description will be made with the sheet feeding from a manual feed tray (multi-purpose tray) 210 serving as a sheet placement portion to the inside of the image forming apparatus 100. The manual feed tray 210 is provided with the manual feed sheet sensor 214. The manual feed sheet sensor 214 is configured to detect a sheet placed on the manual feed tray 210. The CPU 301 determines whether or not a sheet is placed on the manual feed tray 210 based on a detection signal of the manual feed sheet sensor 214. When the CPU 301 receives an instruction to feed the sheet on the manual feed tray 210 from the UI 330 with the sheet being placed on the manual feed tray 210, the CPU 301 operates in the following manner. The CPU 301 drives the manual feed motor 147 through the I/O 307 to rotate the manual feed pickup rollers 211. The manual feed pickup rollers 211 are rotated, to thereby feed the sheets on the manual feed tray 210 one by one. The CPU 301 determines whether or not the sheet feeding operation has been conducted normally based on a detection signal of the registration sheet sensor 160.

The CPU 301 starts the image forming operation of the process unit 120 so as to be in time for a timing at which the sheet arrives at the secondary transfer portion 140. In the process unit 120Y, the charging device 2Y uniformly charges a surface of the photosensitive drum 1Y. The light scanning device 3Y emits a light beam (laser beam) modulated based on image information on a yellow component to the uniformly charged surface of the photosensitive drum 1Y to form an electrostatic latent image on the surface of the photosensitive drum 1Y. The developing device 4Y develops the electrostatic latent image with the yellow toner (developer) to form a yellow toner image. A primary transfer voltage is applied to the primary transfer device 5Y, and the primary transfer device 5Y primarily transfers the yellow toner image on the photosensitive drum 1Y onto the intermediate transfer belt 130. The toner remaining on the photosensitive drum 1Y after the primary transfer is removed by the cleaning device 6Y, and the photosensitive drum 1Y becomes ready for the next image formation.

In the same manner, a magenta toner image formed by the process unit 120M is transferred onto the intermediate transfer belt 130 so as to be superimposed on the yellow toner image on the intermediate transfer belt 130 with high precision. Subsequently, a cyan toner image and a black toner image are transferred onto the intermediate transfer belt 130 so as to be superimposed on the magenta toner image on the intermediate transfer belt 130 in order. As a result, the toner images in the four colors are superimposed on one another on the intermediate transfer belt 130. The toner images superimposed on one another on the intermediate transfer belt 130 arrive at the secondary transfer portion 140 by the rotation of the intermediate transfer belt 130.

The CPU 301 adds one to a counter 310 stored in the EEPROM 304 each time a primary transfer operation is conducted once. The CPU 301 adds one to a counter 311 and a counter 312 stored in the EEPROM 304 each time a developing operation is conducted once. A value (count value) of the counter 310, a value (count value) of the counter 311, and a value (count value) of the counter 312 are used for execution determination of an image quality adjustment operation (adjustment processing) described later.

The sheet is conveyed to registration rollers 161 from the sheet feeding cassette 150 by the cassette pickup roller 151 and conveyance rollers 153, 154, and 155 or from the manual feed tray 210 by the manual feed pickup rollers 211. The CPU 301 detects a position of the conveyed sheet based on the detection signal of the registration sheet sensor 160. In consideration of a timing at which a leading edge portion of the sheet arrived at the registration sheet sensor 160, the CPU 301 controls the conveyance of the sheet so that the leading edge portion of the sheet and a leading edge portion of the toner images on the intermediate transfer belt 130 match at the secondary transfer portion 140. For example, when the sheet arrives earlier than the toner images, the CPU 301 stops the sheet at the registration roller 161 for as long a time as the difference in arrival timing, and then restarts the conveyance of the sheet. When the sheet and the toner images arrive at the secondary transfer portion 140, the secondary transfer portion 140 to which the secondary transfer voltage is applied transfers the toner images onto the sheet.

The sheet onto which the toner images have been transferred is conveyed to the fixing device 170 by a conveyor belt 190. The fixing device 170 heats and pressurizes the sheet to fix the toner images to the sheet. In this manner, a full-color image is formed on the sheet.

When the leading edge portion of the sheet arrives at the fixing sheet sensor 171, the CPU 301 determines which of conveyance paths 230, 231, and 234 the sheet is to be conveyed to based on the content of the job specified by the UI 330 in advance. The CPU 301 switches conveyance flappers 172 and 182, to thereby switch among the conveyance paths 230, 231, and 234 for the sheet. Specifically, when the sheet is conveyed to the image forming portion 320 again during double-sided printing and when the sheet is discharged onto a discharge tray 200 with a printed surface facing down during single-sided printing, the CPU 301 switches the conveyance flapper 172 to convey the sheet to the conveyance path 230. When the sheet is discharged onto a discharge tray 196 or a discharge tray 199 during the single-sided printing or the double-sided printing, the CPU 301 switches the conveyance flapper 182 to convey the sheet to the conveyance path 231. When the sheet is discharged onto the discharge tray 200, the CPU 301 switches the conveyance flappers 172 and 182 to convey the sheet to the conveyance path 234.

The sheet conveyed to the conveyance path 231 is further conveyed to a conveyance path 181 on downstream by conveyance rollers 232, and conveyed to the discharge tray 196 or the discharge tray 199. When a discharge instruction to the discharge tray 196 is issued, a conveyance path is switched to a conveyance path 193 by a flapper 183. The sheet is conveyed from the conveyance path 181 to the conveyance path 193 by discharge rollers 241, 242, and 243 driven by the discharge motor 148, and is discharged onto the discharge tray 196. When a discharge instruction to the discharge tray 199 is issued, the conveyance path is switched to a conveyance path 184 by the flapper 183. The sheet is conveyed from the conveyance path 181 to a conveyance path 198 through the conveyance path 184 by discharge rollers 244, 245, and 246 driven by the discharge motor 149, and is discharged onto the discharge tray 199.

When the sheet is discharged onto the discharge tray 200 with a printed surface facing down during the single-sided printing, the conveyance flapper 172 is switched to convey the sheet to the conveyance path 230. When a trailing edge portion of the sheet arrives at reverse rollers 163, the reverse rollers 163 are rotated in reverse, and the sheet is conveyed to discharge rollers 180, and is discharged onto the discharge tray 200 as it is.

When the sheet having an image formed on one side during the double-sided printing is conveyed to the image forming portion 320 again, the conveyance flapper 172 is switched to convey the sheet to the conveyance path 230. The sheet is conveyed to the two-side reversing conveyance path 233 by duplex conveyance rollers 164, 165, 166, 179, and 168. When the trailing edge portion of the sheet arrives at the duplex conveyance rollers 179, the CPU 301 switches a two-side reversing flapper 178, and rotates the duplex conveyance rollers 179 and 168 in reverse to convey the sheet to duplex conveyance rollers 169. The sheet is conveyed by the duplex conveyance rollers 169 and duplex conveyance rollers 175, 176, and 177, and is passed over to the conveyance rollers 155.

When all the jobs are completed, the CPU 301 displays the completion of the jobs on the UI 330. The above-mentioned image forming operation is merely an example, and the present invention is not limited to the above-mentioned image forming operation.

(Image Quality Adjustment Operation)

Next, the image quality adjustment operation executed by the CPU 301 is described with reference to Table 1.

Table 1 is a table for showing an image quality adjustment type.

TABLE 1

| Number | Image quality adjustment type | Execution condition | Required time | Retry |
|---|---|---|---|---|
| 1 | Transfer voltage correction | Value of counter 310 ≥ 250 | 5 seconds | Present |

TABLE 1-continued

| Number | Image quality adjustment type | Execution condition | Required time | Retry |
|---|---|---|---|---|
| 2 | Density correction | Value of counter 311 ≥ 300 | 10 seconds | Absent |
| 3 | Color misregistration correction | Value of counter 312 ≥ 350 | 20 seconds | Absent |

In Table 1, a type, an execution condition, a required time, and presence or absence of a retry operation of an image quality adjustment executed by the CPU 301 are shown. The required time shown in Table 1 is a time required from the start of one image quality adjustment operation until the end. Retrying (readjusting) an image quality adjustment when the image quality adjustment operation fails is referred to as "retry operation (readjustment operation)". When the retry operation is executed, the required time increases so as to correspond to the number of times that the retry operation has been executed. In the embodiment, the transfer voltage correction is an image quality adjustment (first image quality adjustment) having a possibility that the retry operation may be executed. The density correction and the color misregistration correction are each an image quality adjustment (second image quality adjustment) having no possibility that the retry operation may be executed.

The CPU 301 functions as an image quality adjusting portion (adjustment unit) configured to adjust image quality of the image to be formed on the sheet by the image forming portion 320. The CPU 301 verifies the execution condition for each image quality adjustment during an image forming operation. When the execution condition is satisfied, the CPU 301 suspends the image forming operation, and executes the image quality adjustment operation for which the execution condition is satisfied. After the image quality adjustment operation is ended, the CPU 301 restarts the image forming operation. When there are a plurality of image quality adjustments for which the execution condition is satisfied, the CPU 301 combines the image quality adjustment operations, and executes the image quality adjustment operations in ascending order of the number. In the embodiment, when a plurality of image quality adjustment operations are sequentially executed, the image quality adjustment operation having the possibility that the retry operation may be executed is executed before the image quality adjustment operation having no possibility that the retry operation may be executed. Further, in the embodiment, the image quality adjustment operation having a short required time is executed before the image quality adjustment operation having a long required time. However, the order of the image quality adjustment operations for a case where a plurality of image quality adjustment operations are sequentially executed is not limited thereto, and may be another order. The CPU 301 is capable of executing the image quality adjustments both individually and in combination based on an instruction received from the UI 330. In any one of the cases, after completing each image quality adjustment, the CPU 301 initializes the value of the counter 310, the value of the counter 311, and the value of the counter 312 to zero.

The transfer voltage correction is an operation for calculating the transfer voltage for obtaining satisfactory transferability based on voltage-current characteristics of the primary transfer device 5. The transfer voltage correction may involve a retry operation when an appropriate transfer voltage fails to be obtained in one operation. Therefore, the required time (first required time) of the transfer voltage correction is 5 seconds for one time, but may increase due to the execution of a retry operation. An operation for the transfer voltage correction is described later.

The density correction is an operation for adjusting a toner density inside the developing device 4 of the process unit 120 and a parameter of the image processing portion 316 in order to maintain an appropriate toner density. The toner density represents a toner-carrier mixture ratio (weight ratio) inside the developing device 4 or a quantity of a toner born on the toner image (transferred mass of toner per area of the toner image) formed on the intermediate transfer belt 130. In a density correction operation, a patch image for the density correction is formed on the intermediate transfer belt 130. The patch sensor 406 detects a density of the patch image for the density correction. The CPU 301 adjusts the toner amount to be supplied from the developer container 12 to the developing device 4 and adjusts the parameter of the image processing portion 316 based on a result of detecting the density of the patch image for the density correction. The density correction does not involve the execution of a retry operation, and the operation is completed in 10 seconds being the required time (second required time).

The color misregistration correction is an operation for adjusting a parameter of the image processing portion 316 in order to reduce a color misregistration amount of the color image to be formed on the sheet. In a color misregistration correction operation, the pattern image for the color misregistration correction is formed on the intermediate transfer belt 130. The patch sensor 406 detects the misregistration amount of the pattern image for the color misregistration correction. The CPU 301 adjusts the parameter of the image processing portion 316 based on a result of detecting the misregistration amount of the pattern image for the color misregistration correction. The color misregistration correction does not involve the execution of a retry operation, and the operation is ended in 20 seconds being the required time (second required time).

The above-mentioned image quality adjustment types are examples of the image quality adjustments executed by the image forming apparatus 100, and the present invention is not limited thereto. The required time of each of the transfer voltage correction, the density correction, and the color misregistration correction is not limited to the above-mentioned numerical value, and may be set to a value corresponding to the structure of the image forming apparatus 100.

(Transfer Voltage Correction)

Figure 4:
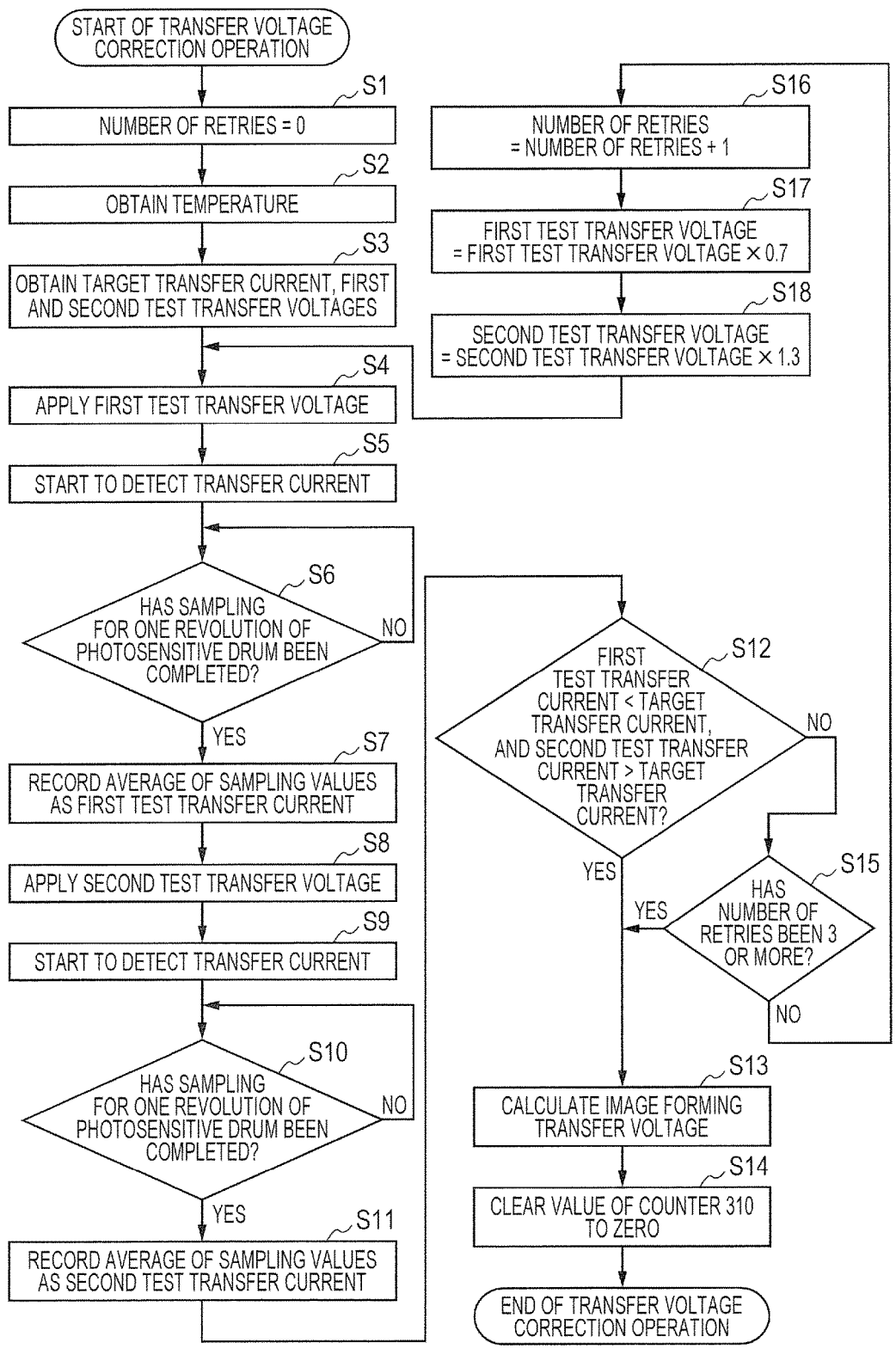
FIG. 4 is a flowchart for illustrating a transfer voltage correction operation executed by a CPU.

Next, with reference to FIG. 4, a description will be made with the transfer voltage correction being one of the image quality adjustment operations executed by the CPU 301. FIG. 4 is a flowchart for illustrating a transfer voltage correction operation executed by the CPU 301. The CPU 301 executes the transfer voltage correction operation based on a program stored in the ROM 302.

The CPU 301 compares the value of the counter 310 with a predetermined threshold value for each primary transfer operation. When the value of the counter 310 is larger than the predetermined threshold value, the CPU 301 executes the transfer voltage correction operation illustrated in FIG. 4. When the transfer voltage correction operation is started, the CPU 301 clears the number of retries to zero (S1). The CPU 301 obtains a present temperature based on a detection signal of the environmental sensor 405 (S2). The CPU 301 obtains a target transfer current for obtaining the satisfactory transferability from the ROM 302 based on the obtained temperature (S3). The CPU 301 further obtains a first test transfer voltage and a second test transfer voltage for obtaining the voltage-current characteristics from the ROM 302 (S3). The first test transfer voltage is lower than the second test transfer voltage in terms of absolute value (|(first test transfer voltage)|<|(second test transfer voltage)|).

Subsequently, the CPU 301 applies the first test transfer voltage to the primary transfer device 5 (S4). The CPU 301 starts causing the transfer voltage sensors 11Y, 11M, 11C, and 11K of the primary transfer devices 5Y, 5M, 5C, and 5K to detect a transfer current (S5). The CPU 301 samples a value of the transfer current for one revolution of the photosensitive drum 1 at intervals defined in advance based on detection signals of the transfer voltage sensors 11Y, 11M, 11C, and 11K (S6). The CPU 301 averages the sampled values, and records a value obtained by the averaging in the RAM 303 as a first test transfer current (S7).

Subsequently, the CPU 301 applies the second test transfer voltage to the primary transfer device 5 (S8). In the same manner as in the case of the first test transfer voltage, the CPU 301 starts causing the transfer voltage sensor 11 to detect the transfer current (S9), and samples the value of the transfer current for one revolution of the photosensitive drum 1 (S10). The CPU 301 averages the sampled values, and records a value obtained by the averaging in the RAM 303 as a second test transfer current (S11).

Subsequently, the CPU 301 examines whether or not the target transfer current falls within a range between the first test transfer current and the second test transfer current. Specifically, the CPU 301 determines whether or not the first test transfer current is smaller than the target transfer current and the second test transfer current is larger than the target transfer current (S12). When the target transfer current falls within the range between the first test transfer current and the second test transfer current (YES in S12), the CPU 301 conducts linear interpolation from the voltage-current characteristics at two points, and calculates an image forming transfer voltage from which the target transfer current can be obtained (S13). The CPU 301 clears the value of the counter 310 to zero (S14), and ends the transfer voltage correction operation.

Meanwhile, when the target transfer current does not fall within the range between the first test transfer current and the second test transfer current, appropriate voltage-current characteristics fail to be obtained from the calculation of the image forming transfer voltage, and hence the CPU 301 determines that the first test transfer voltage and the second test transfer voltage are not appropriate. Therefore, the CPU 301 changes the first test transfer voltage and the second test transfer voltage to conduct the retry operation. When the target transfer current does not fall within the range between the first test transfer current and the second test transfer current (NO in S12), the CPU 301 determines whether or not the number of retries is three (predetermined number of times) or more (S15). When the number of retries is not three or more (NO in S15), the CPU 301 increments the number of retries by one (S16).

The CPU 301 resets the first test transfer voltage by multiplying the first test transfer voltage by a first coefficient as in the following expression (S17).

(first test transfer voltage)=(first test transfer voltage)×0.7

Further, the CPU 301 resets the second test transfer voltage by multiplying the second test transfer voltage by a second coefficient as in the following expression (S18).

(second test transfer voltage)=(second test transfer voltage)×1.3

After that, the process returns to Step S4, and the CPU 301 again conducts the application of the first test transfer voltage and the second test transfer voltage and the detection of the first test transfer current and the second test transfer current, and determines whether or not the target transfer current falls within the range between the obtained two test transfer currents (S4 to S12).

When the target transfer current does not fall within the range between the two test transfer currents even after the retry operation is conducted three times (YES in S15), the CPU 301 conducts extrapolation from the last result to calculate the image forming transfer voltage (S13). As described above, the required time of the transfer voltage correction is changed based on the number of times that the retry operation has been executed. The above-mentioned transfer voltage correction operation is merely an example, and the present invention is not limited to the above-mentioned transfer voltage correction operation.

(Initial Setting of Image Quality Adjustment Time)

Figure 5:
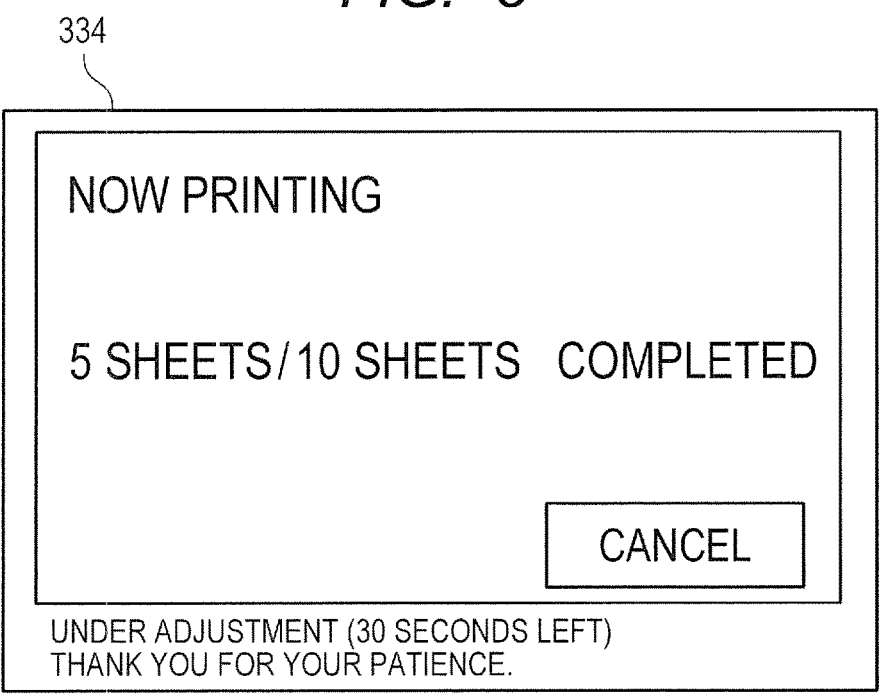
FIG. 5 is a diagram for illustrating a display example of an image quality adjustment time.

FIG. 5 is a diagram for illustrating a display example of an image quality adjustment time. According to the embodiment, the required time of the image quality adjustment operation is displayed in a lower part of the display 334 as illustrated in FIG. 5. The required time is displayed by being parenthesized after the wording "under adjustment" as remaining seconds while being counted down. In the embodiment, the CPU 301 changes the frequency of countdown (display interval), that is, a resolution (unit time) for switching the display based on the type of image quality adjustment.

Figure 6A:
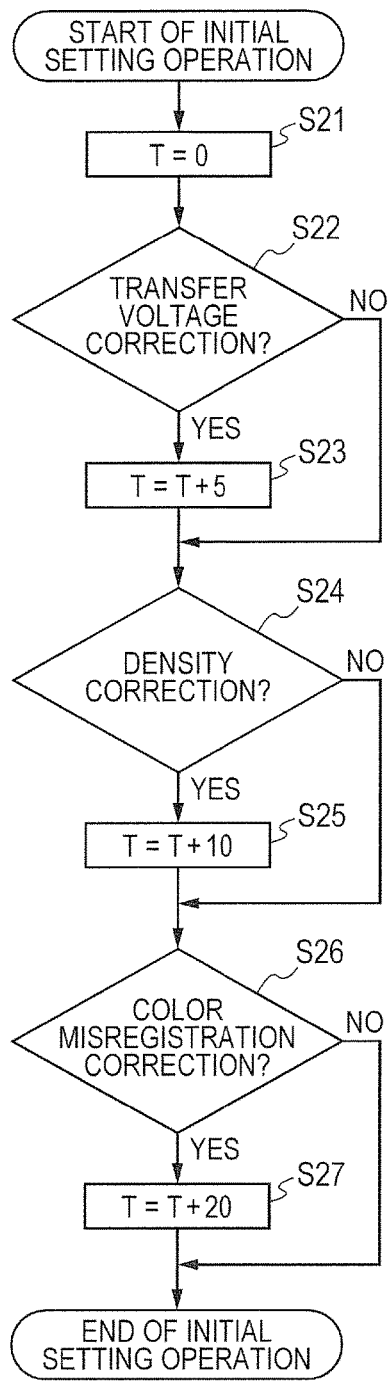
FIGS. 6A and 6B are flowcharts for each illustrating a display operation of the image quality adjustment time according to a first embodiment of the present invention executed by the CPU.
Figure 6B:
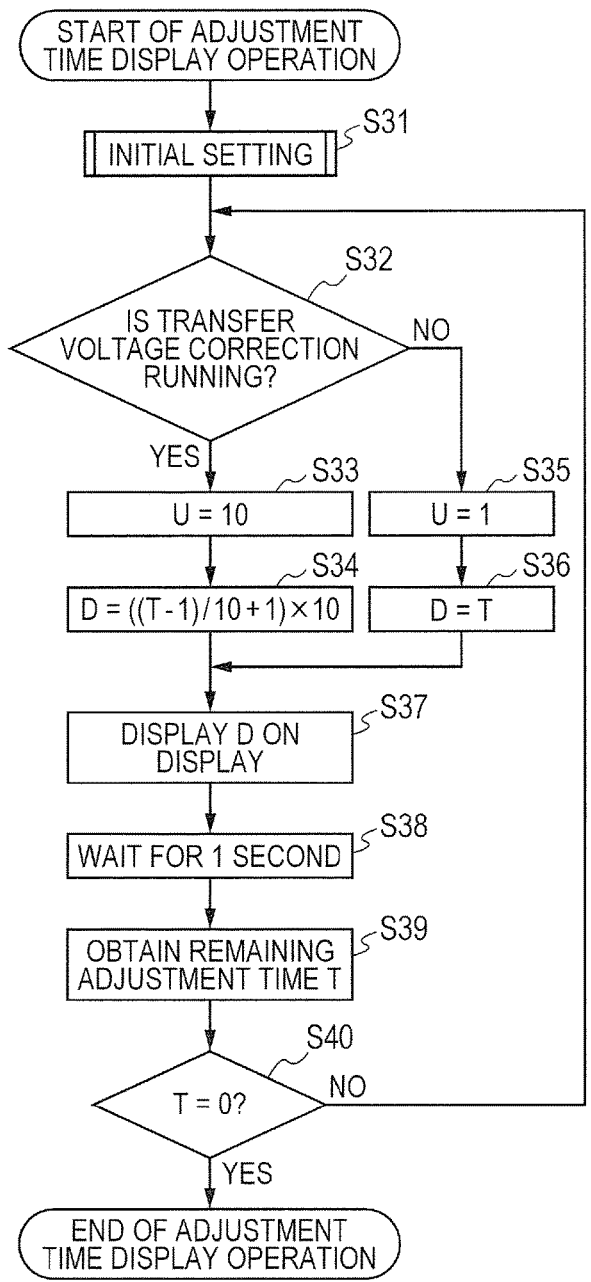

First, an initial setting required for displaying the image quality adjustment time is described with reference to Table 1 and FIG. 6A and FIG. 6B. FIG. 6A and FIG. 6B are flowcharts for each illustrating the display operation of the image quality adjustment time according to the first embodiment executed by the CPU 301. FIG. 6A is the flowchart for illustrating an initial setting operation required for displaying the image quality adjustment time. The CPU 301 executes the initial setting operation based on a program stored in the ROM 302. The CPU 301 functions as an image quality adjustment time prediction portion (determination unit configured to determine the required time) configured to predict the required time of the image quality adjustment. The CPU 301 executes the initial setting operation illustrated in FIG. 6A before displaying an adjustment time in order to calculate an adjustment time of the image quality adjustment to be executed individually or a total sum of adjustment times of all the image quality adjustments to be executed in combination.

When the initial setting operation is started, the CPU 301 initializes a remaining adjustment time T to zero (S21). The CPU 301 determines whether or not to execute the transfer voltage correction (S22). Specifically, when the value of the counter 310 is 250 or more, the CPU 301 executes a transfer voltage correction operation (Table 1). When the transfer voltage correction is to be executed (YES in S22), the CPU 301 adds 5 to the remaining adjustment time T (S23). When the transfer voltage correction is not to be executed (NO in S22), the process advances to Step S24. Subsequently, the CPU 301 determines whether or not to execute the density correction (S24). Specifically, when the value of the counter 311 is 300 or more, the CPU 301 executes the density correction. When the density correction is to be executed (YES in S24), the CPU 301 adds 10 to the remaining adjustment time T (S25). When the density correction is not to be executed (NO in S24), the process advances to Step S26. Subsequently, the CPU 301 determines whether or not to execute the color misregistration correction (S26). Specifically, when the value of the counter 312 is 350 or more, the CPU 301 executes the color misregistration correction. When the color misregistration correction is to be executed (YES in S26), the CPU 301 adds 20 to the remaining adjustment time T (S27), and ends the initial setting operation. When the color misregistration correction is not to be executed (NO in S26), the CPU 301 ends the initial setting operation. In this manner, the required time of the image quality adjustment to be executed individually or a total value of the required times of a plurality of image quality adjustments to be executed sequentially is set as an initial setting value of the remaining adjustment time T.

(Displaying of Image Quality Adjustment Time)

Next, with reference to Table 1 and FIG. 6B, a description will be made with displaying of the image quality adjustment time. FIG. 6B is a flowchart for illustrating a display operation of the image quality adjustment time. The CPU 301 executes the display operation of the image quality adjustment time based on a program stored in the ROM 302. When any one of the execution conditions for the image quality adjustment shown in Table 1 is satisfied, the CPU 301 starts an adjustment time display operation.

When the adjustment time display operation is started, the CPU 301 executes the initial setting in order to calculate a total sum of the required times of all the image quality adjustments to be executed (S31). The initial setting is executed based on the above-mentioned subroutine illustrated in FIG. 6A. When the initial setting is completed, the CPU 301 determines whether or not the image quality adjustment operation running at the current time point is the transfer voltage correction (S32). When the transfer voltage correction is running (YES in S32), the process advances to Step S33. The CPU 301 sets a unit time U for switching the displayed remaining adjustment time T to 10 seconds (S33). In Step S33, the CPU 301 determines the resolution of the remaining adjustment time T displayed on the display 334 of the UI 330. In the embodiment, the remaining adjustment time T of the transfer voltage correction is displayed in units of 10 seconds (first resolution) larger than 5 seconds being the required time of the transfer voltage correction.

Subsequently, in order to display the remaining adjustment time T in units of 10 seconds, the CPU 301 rounds up the remaining adjustment time T by the following expression to obtain a displayed required time D to be displayed on the display 334 (S34):

$$D=((T-1)/10+1)\times 10$$

where the value of (T-1)/10 is rounded up to the whole number. For example, when the remaining adjustment time T is 5 seconds, (T-1)/10 is 0, and hence the displayed required time D is 10 seconds. When the remaining adjustment time T is 15 seconds, (T-1)/10 is 1, and hence the displayed required time D is 20 seconds. When the remaining adjustment time T is 35 seconds, (T-1)/10 is 3, and hence the displayed required time D is 40 seconds. The CPU 301 displays the displayed required time D on the display 334 (S37).

Meanwhile, when the transfer voltage correction is not running (NO in S32), the process advances to Step S35. The CPU 301 sets the unit time U for switching the displayed remaining adjustment time T to 1 second (S35). In Step S35, the image quality adjustment is conducted without involving the execution of the transfer voltage correction, that is, without being followed by a retry operation, and hence the resolution is set finer than in the case where the image quality adjustment involves a retry operation. In the embodiment, the remaining adjustment time T is displayed in units of 1 second (second resolution). The remaining adjustment time T is displayed in units of 1 second, and hence the remaining adjustment time T is the displayed required time D to be displayed on the display 334 as it is (S36). The CPU 301 displays the displayed required time D on the display 334 (S37).

The CPU 301 waits for 1 second being a minimum resolution (S38). After that, the CPU 301 obtains the remaining adjustment time T at the current time point (S39). The CPU 301 determines whether or not the remaining adjustment time T obtained in Step S39 is zero (S40). When the remaining adjustment time T is zero (YES in S40), the CPU 301 ends the adjustment time display operation. When the remaining adjustment time T is not zero (NO in S40), the process returns to Step S32, and repeats the adjustment time display operation.

(Transition of Image Quality Adjustment Time)

Display examples of the required time based on the display operation of the image quality adjustment time described with reference to Table 1, FIG. 6A, and FIG. 6B are shown in Table 2, Table 3, and Table 4. In Table 2, the display example of the required time for a case where the transfer voltage correction is executed is shown.

TABLE 2

Transfer voltage correction
Initial setting value of remaining adjustment time T: 5 seconds
Unit time U: 10 seconds
Retry operation may be executed, but retry operation is not executed

| Remaining adjustment time T (seconds) | 5 | 4 | 3 | 2 | 1 | 0 |
|---|---|---|---|---|---|---|
| Displayed required time D (seconds) | 10 | 10 | 10 | 10 | 10 | 0 |

The transfer voltage correction is an image quality adjustment operation having a possibility that the retry operation may be executed, but the display example of a case where the retry operation is not executed is shown in Table 2. The remaining adjustment time T is initialized to 5 seconds for the transfer voltage correction based on Table 1. The transfer voltage correction is the image quality adjustment operation having a possibility that the retry operation may be executed, and hence the unit time U is set to 10 seconds in Step S33 of FIG. 6B. The required time is displayed in units of 10 seconds, and hence, as shown in Table 2, 10 seconds is displayed on the display 334 when the remaining adjustment time T is one of 5 seconds to 1 second. The retry operation is not executed when a correct result of executing the transfer voltage correction operation is obtained, and hence the remaining adjustment time T and the displayed required time D are both 0 seconds. Then, the CPU 301 ends the adjustment time display operation.

In Table 3, the display example of the required time for a case where the retry operation has been executed for the transfer voltage correction only once is shown.

TABLE 3

Transfer voltage correction
Initial setting value of remaining adjustment time T: 5 seconds
Unit time U: 10 seconds
Retry operation may be executed, and retry operation has been executed once

| Remaining adjustment time T (seconds) | 5 | 4 | 3 | 2 | 1 | 5 | 4 | 3 | 2 | 1 | 0 |
|---|---|---|---|---|---|---|---|---|---|---|---|
| Displayed required time D (seconds) | 10 | 10 | 10 | 10 | 10 | 10 | 10 | 10 | 10 | 10 | 0 |

Even when the retry operation is executed, the displayed required time is 10 seconds, and hence the user is not given such a confusing impression that image formation is not restarted even after the displayed required time becomes 0 seconds unlike the related art. Moreover, the user is not given such a confusing impression that the displayed required time increases from 1 second to 5 seconds unlike the related art. In this manner, even when the retry operation is executed, a time difference between the displayed required time D and a time to be taken until the image formation is restarted is small, which can reduce an occurrence of the user's error in grasping a timing to collect an output product.

In Table 4, the display example of a case where the density correction involving no retry operation is executed is shown.

TABLE 4

Density correction
Initial setting value of remaining adjustment time T: 10 seconds
Unit time U: 1 second
There is no possibility that retry operation may be executed

| Remaining adjustment time T (seconds) | 10 | 9 | 8 | 7 | 6 | 5 | 4 | 3 | 2 | 1 | 0 |
|---|---|---|---|---|---|---|---|---|---|---|---|
| Displayed required time D (seconds) | 10 | 9 | 8 | 7 | 6 | 5 | 4 | 3 | 2 | 1 | 0 |

The density correction is an image quality adjustment operation having no possibility that the retry operation may be executed. The remaining adjustment time T is initialized to 10 seconds for the density correction based on Table 1. The unit time U is set to 1 second in Step S35 of FIG. 6B. The unit time U is set to the same value as 1 second of the resolution, and hence the display is changed every second. As shown in Table 4, the displayed required time D is counted down from 10 seconds every second in the same manner as the remaining adjustment time T. When the remaining adjustment time T and the displayed required time D both become 0 seconds, and the CPU 301 ends the adjustment time display operation. The displayed required time D is the same as the remaining adjustment time T, and hence the user can easily grasp the timing at which the output product can be collected.

The color misregistration correction is the image quality adjustment operation having no possibility that the retry operation may be executed, and hence the adjustment time display operation is the same as the density correction except that the initial setting value of the remaining adjustment time T is 20 seconds. Therefore, a description of the adjustment time display operation for the color misregistration correction is omitted.

In Table 5, the display example of a case where the transfer voltage correction and the density correction are executed sequentially is shown.

TABLE 5

Transfer voltage correction + density correction
Initial setting value of remaining adjustment time T: 5 seconds + 10 seconds
Unit time U: 10 seconds (transfer voltage correction), 1 second (density correction)
Retry operation may be executed, but retry operation is not executed

| Remaining adjustment time T (seconds) | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Displayed required time D (seconds) | 20 | 20 | 20 | 20 | 20 | 10 | 9 | 8 | 7 | 6 | 5 | 4 | 3 | 2 | 1 | 0 |

The remaining adjustment time T is initialized to 15 seconds by adding 10 seconds for the density correction to 5 seconds for the transfer voltage correction based on Table 1 (FIG. 6A). The transfer voltage correction is the image quality adjustment operation having a possibility that the retry operation may be executed, and hence the unit time U is set to 10 seconds in Step S33 of FIG. 6B. The required time is displayed in units of 10 seconds, and hence, as shown in Table 5, "20 seconds" is displayed on the display 334 when the remaining adjustment time T is one of 15 seconds to 11 seconds. The first transfer voltage correction operation is successful, and the execution of a density correction operation is started. The CPU 301 again predicts the remaining adjustment time T in Step S39 of FIG. 6B. The CPU 301 sets the unit time U to 1 second in Step S35 of FIG. 6B. The CPU 301 updates the displayed required time D based on the remaining adjustment time T predicted again. As shown in Table 5, the displayed required time D is counted down from 10 seconds every second in the same manner as the remaining adjustment time T. When the density correction operation is ended, the remaining adjustment time T and the displayed required time D both become 0 seconds. Then, the CPU 301 ends the adjustment time display operation.

When the transfer voltage correction and the density correction are executed sequentially as shown in Table 5, the CPU 301 determines each image quality adjustment operation, and switches the resolution (unit time U) to display the displayed required time D. With this configuration, it is possible to display the displayed required time D on the display 334 so as to allow the user to appropriately estimate a timing at which the image formation is to be restarted.

According to the embodiment, the resolution of the displayed required time can be changed based on the type of image quality adjustment. According to the embodiment, the resolution of the remaining adjustment time of the transfer voltage correction having a possibility that the retry operation may be executed is set coarser than the resolution of the remaining adjustment time of the density correction or the color misregistration correction having no possibility that the retry operation may be executed. A countdown interval of the displayed required time D becomes larger, which allows the user to roughly estimate a remaining time to be taken until the image quality adjustment is completed. Hence, even when the retry operation is executed, the time difference between the displayed required time D being displayed and the time to be taken until the image formation is restarted is small, which can reduce the occurrence of the user's error in grasping the timing to collect the output product. Therefore, even when the retry operation is executed for the transfer voltage correction, the displayed required time D that can reduce the possibility of the user's error in grasping the timing to collect the output product can be displayed on the display 334.

[Second Embodiment]

Next, a second embodiment of the present invention will be described. In the second embodiment, the same components as those of the first embodiment are denoted by the same reference symbols, and descriptions thereof are omitted. The image forming apparatus 100, the image forming operation, and the image quality adjustment operation according to the second embodiment are the same as those of the first embodiment, and hence descriptions thereof are omitted. The second embodiment is different from the first embodiment in the initial setting value of the remaining adjustment time T used in the initial setting of the image quality adjustment time, and hence different points are mainly described below.

(Initial Setting of Image Quality Adjustment Time)

In the first embodiment, in the case of the transfer voltage correction being the image quality adjustment having a possibility that the retry operation may be executed, the remaining adjustment time T is set to 5 seconds being the time required for one transfer voltage correction operation. In contrast, in the second embodiment, the required time of the transfer voltage correction operation is set to a time required for executing retry operations corresponding to the maximum number of times. Specifically, the maximum number of retries of the transfer voltage correction is three, and hence there is a possibility that the transfer voltage correction operation may be executed four times in total including the first time. Therefore, the required time of the transfer voltage correction within Table 1 is set to 20 seconds (=(5 seconds)×(4 times)). In Step S23 of the initial setting operation illustrated in FIG. 6A, the CPU 301 adds 20 to the remaining adjustment time T.

(Displaying of Image Quality Adjustment Time)

The display operation of the image quality adjustment time is the same as the operation according to the first embodiment illustrated in FIG. 6B except that the initial setting value set as the remaining adjustment time T in the initial setting operation is different, and hence a description thereof is omitted.

(Transition of Image Quality Adjustment Time)

Display examples of the required time according to the second embodiment are shown in Table 6, Table 7, Table 8, and Table 9. In Table 6, the display example of the required time for a case where the transfer voltage correction is executed is shown.

TABLE 6

Transfer voltage correction
Initial setting value of remaining adjustment time T: 20 seconds
Unit time U: 10 seconds
Retry operation may be executed, but retry operation is not executed

| Remaining adjustment time T (seconds) | 20 | 19 | 18 | 17 | 16 | 0 |
|---|---|---|---|---|---|---|
| Displayed required time D (seconds) | 20 | 20 | 20 | 20 | 20 | 0 |

In Table 6, the display example of a case where the retry operation is not executed is shown. The remaining adjustment time T is initialized to 20 seconds in Step S23 of FIG. 6A. It is determined in Step S32 of FIG. 6B that the transfer voltage correction is running, and hence the unit time U is set to 10 seconds in Step S33. The required time is displayed in units of 10 seconds, and hence, as shown in Table 6, "20 seconds" is displayed on the display 334 when the remaining adjustment time T during the transfer voltage correction operation is one of 20 seconds to 16 seconds. The first transfer voltage correction operation is successful, which does not involve the execution of a retry operation, and hence the remaining adjustment time T is changed from 16 seconds to 0 seconds (S39). The displayed required time D is switched from 20 seconds to 0 seconds, and the CPU 301 ends the adjustment time display operation.

In Table 7, the display example of the required time for a case where the retry operation is executed for the transfer voltage correction only once is shown.

TABLE 7

Transfer voltage correction
Initial setting value of remaining adjustment time T: 20 seconds
Unit time U: 10 seconds
Retry operation may be executed, and retry operation has been executed once

| Remaining adjustment time T (seconds) | 20 | 19 | 18 | 17 | 16 | 15 | 14 | 13 | 12 | 11 | 0 |
|---|---|---|---|---|---|---|---|---|---|---|---|
| Displayed required time D (seconds) | 20 | 20 | 20 | 20 | 20 | 20 | 20 | 20 | 20 | 20 | 0 |

The required time is displayed in units of 10 seconds, and hence, as shown in Table 7, "20 seconds" is displayed on the display 334 when the remaining adjustment time T during the first transfer voltage correction operation is one of 20 seconds to 16 seconds. The first transfer voltage correction operation fails, and the retry operation is executed once. When the remaining adjustment time T during the retry operation is one of 15 seconds to 11 seconds, "20 seconds" is displayed on the display 334. The first retry operation is successful, and the remaining adjustment time T is changed from 11 seconds to 0 seconds (S39). The displayed required time D is switched from 20 seconds to 0 seconds, and the CPU 301 ends the adjustment time display operation.

In Table 8, the display example of the required time for a case where the retry operation has been executed for the transfer voltage correction twice is shown.

TABLE 8

Transfer voltage correction
Initial setting value of remaining adjustment time T: 20 seconds
Unit time U: 10 seconds
Retry operation may be executed, and retry operation has been executed twice

| Remaining adjustment time T (seconds) | 20 | 19 | 18 | 17 | 16 | 15 | 14 | 13 | 12 | 11 | 10 | 9 | 8 | 7 | 6 | 0 |
|---|---|---|---|---|---|---|---|---|---|---|---|---|---|---|---|---|
| Displayed required time D (seconds) | 20 | 20 | 20 | 20 | 20 | 20 | 20 | 20 | 20 | 20 | 10 | 10 | 10 | 10 | 10 | 0 |

As shown in Table 8, when the remaining adjustment time T during the first transfer voltage correction operation is one of 20 seconds to 16 seconds, "20 seconds" is displayed on the display 334. The first transfer voltage correction operation fails, and the first retry operation is executed. When the remaining adjustment time T during the first retry operation is one of 15 seconds to 11 seconds, "20 seconds" is displayed on the display 334. When the first retry operation fails, the second retry operation is executed. When the remaining adjustment time T during the second retry operation is one of 10 seconds to 6 seconds, the required time is displayed in units of 10 seconds, and hence "10 seconds" is displayed on the display 334. The second retry operation is successful, and the remaining adjustment time T is changed from 6 seconds to 0 seconds (S39). The displayed required time D is switched from 10 seconds to 0 seconds, and the CPU 301 ends the adjustment time display operation.

In Table 9, the display example of the required time for a case where the retry operation has been executed for the transfer voltage correction three times is shown.

TABLE 9

Transfer voltage correction
Initial setting value of remaining adjustment time T: 20 seconds
Unit time U: 10 seconds
Retry operation may be executed, and retry operation has been executed three times

| Remaining adjustment time T (seconds) | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|
| Displayed required time D (seconds) | 20 | 20 | 20 | 20 | 20 | 20 | 20 | 20 | 20 | 20 | 10 | 10 | 10 | 10 | 10 | 10 | 10 | 10 | 10 | 10 | 0 |

As shown in Table 9, when the remaining adjustment time T during the first transfer voltage correction operation is one of 20 seconds to 16 seconds, "20 seconds" is displayed on the display 334. The first transfer voltage correction operation fails, and the first retry operation is executed. When the remaining adjustment time T during the first retry operation is one of 15 seconds to 11 seconds, "20 seconds" is displayed on the display 334. The first retry operation fails, and the second retry operation is executed. When the remaining adjustment time T during the second retry operation is one of 10 seconds to 6 seconds, the required time is displayed in units of 10 seconds, and hence "10 seconds" is displayed on the display 334. The second retry operation fails, and the third retry operation is executed. When the remaining adjustment time T during the third retry operation is one of 5 seconds to 1 second, "10 seconds" is displayed on the display 334. The third retry operation is successful, and the remaining adjustment time T is changed to 0 seconds (S39). The displayed required time D is switched from 10 seconds to 0 seconds, and the CPU 301 ends the adjustment time display operation.

According to the embodiment, the resolution of the displayed required time can be changed based on the type of image quality adjustment. According to the embodiment, in the case of the transfer voltage correction being the image quality adjustment having a possibility that the retry operation may be executed, the time required for executing the retry operations corresponding to the maximum number of times is displayed as the displayed required time D. Therefore, even when the retry operation is executed for the transfer voltage correction, the displayed required time D that can reduce the possibility of the user's error in grasping the timing to collect the output product can be displayed on the display 334.

[Third Embodiment]

Next, a third embodiment of the present invention will be described. In the third embodiment, the same components as those of the first or second embodiment are denoted by the same reference symbols, and descriptions thereof are omitted. The image forming apparatus 100, the image forming operation, and the image quality adjustment operation according to the third embodiment are the same as those of the first embodiment, and hence descriptions thereof are omitted. In the first embodiment and the second embodiment, when a plurality of image quality adjustment operations are executed sequentially, the resolution (unit time U) is switched between the image quality adjustment operation having a possibility that the retry operation may be executed and the image quality adjustment operation having no possibility that the retry operation may be executed. With this configuration, the displayed required time D is displayed on the display 334 so as allow the user to appropriately estimate the timing at which the image formation is to be restarted. In contrast, in the third embodiment, when at least one image quality adjustment operation having a possibility that the retry operation may be executed is included in a plurality of image quality adjustment operations to be executed sequentially, the resolutions are unified into one coarse resolution (unit time U). The displayed required time D of the series of image quality adjustment operations is displayed on the display 334 with one coarse resolution. Points different from those of the first embodiment and the second embodiment are mainly described below.

(Initial Setting of Image Quality Adjustment Time)

First, an initial setting required for displaying the image quality adjustment time is described with reference to FIGS. 7A and 7B. FIGS. 7A and 7B are flowcharts for each illustrating the display operation of the image quality adjustment time according to the third embodiment executed by the CPU 301. In the flowcharts of FIG. 7A and FIG. 7B, the same steps as those of the flowcharts of FIG. 6A and FIG. 6B are denoted by the same step numbers, and descriptions thereof are omitted. FIG. 7A is the flowchart for illustrating an initial setting operation required for displaying the image quality adjustment time. The CPU 301 executes the initial setting operation based on a program stored in the ROM 302. Before displaying the adjustment time, the CPU 301 executes the initial setting operation illustrated in FIG. 7A in order to determine the unit time U as the resolution and to calculate a total sum of the adjustment times for all the image quality adjustments to be executed in combination (initial setting value of the remaining adjustment time T).

In the third embodiment, after determining whether or not to execute the transfer voltage correction (S22), the CPU 301 determines the unit time U as the resolution (S51 and S52). The CPU 301 determines whether or not at least one image quality adjustment operation having a possibility that the retry operation may be executed is included in the plurality of image quality adjustment operations to be executed sequentially based on the determination as to whether or not to execute the transfer voltage correction (S22). When the transfer voltage correction is to be executed (YES in S22), the CPU 301 determines that at least one image quality adjustment operation having a possibility that the retry operation may be executed is included in the plurality of image quality adjustment operations to be executed sequentially. Therefore, when the transfer voltage correction is to be executed (YES in S22), the unit time U is set to 10 seconds being a coarse resolution (S51). When the transfer voltage correction is not to be executed (NO in S22), the CPU 301 determines that no image quality adjustment operation having a possibility that the retry operation may be executed is included in the plurality of image quality adjustment operations to be executed sequentially. Therefore, the unit time U is set to 1 second being a fine resolution (S52). After that, in the same manner as in the first embodiment, the CPU 301 calculates the total value of the required times of the plurality of image quality adjustments to be executed sequentially, and sets the total value as the initial setting value of the remaining adjustment time T.

(Displaying of Image Quality Adjustment Time)

Next, a description will be made with displaying of an image quality adjustment time according to the third embodiment. FIG. 7B is the flowchart for illustrating the display operation of the image quality adjustment time. The CPU 301 executes the display operation of the image quality adjustment time based on a program stored in the ROM 302. In the display operation of the image quality adjustment time illustrated in FIG. 7B, the remaining adjustment time T and the unit time U being the resolution set in the initial setting operation of FIG. 7A are used. After executing the initial setting (S31), the CPU 301 determines whether or not the unit time U is 10 seconds (S53). When the unit time U is 10 seconds (YES in S53), the CPU 301 rounds up the remaining adjustment time T to obtain a displayed required time D to be displayed on the display 334 in order to display the remaining adjustment time T in units of 10 seconds (S34). The CPU 301 displays the displayed required time D on the display 334 (S37).

Meanwhile, when the unit time U is not 10 seconds (NO in S53), that is, when the unit time U is 1 second, the remaining adjustment time T is the displayed required time D to be displayed on the display 334 as it is (S36). The CPU 301 displays the displayed required time D on the display 334 (S37). The subsequent steps are the same as those of the first embodiment, and hence descriptions thereof are omitted.

(Transition of Image Quality Adjustment Time)

Display examples of the required time based on the display operation of the image quality adjustment time described with reference to FIG. 7A and FIG. 7B are shown in Table 10. In Table 10, the display example of a case where the transfer voltage correction and the density correction are executed sequentially is shown.

TABLE 10

Transfer voltage correction + density correction
Initial setting value of remaining adjustment time T: 5 seconds + 10 seconds
Unit time U: 10 seconds
Retry operation may be executed, but retry operation is not executed

| Remaining adjustment time T (seconds) | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Displayed required time D (seconds) | 20 | 20 | 20 | 20 | 20 | 10 | 10 | 10 | 10 | 10 | 10 | 10 | 10 | 10 | 10 | 0 |

The remaining adjustment time T is initialized to 15 seconds by adding 10 seconds for the density correction to 5 seconds for the transfer voltage correction based on Table 1 (FIG. 7A). The plurality of image quality adjustment operations to be executed sequentially include the transfer voltage correction having a possibility that the retry operation may be executed, and hence the unit time U is set to 10 seconds in Step S51 of FIG. 7A. The required time is displayed in units of 10 seconds, and hence, as shown in Table 10, "20 seconds" is displayed on the display 334 when the remaining adjustment time T is one of 15 seconds to 11 seconds. The first transfer voltage correction operation is successful, and the execution of the density correction operation is started. The CPU 301 again predicts the remaining adjustment time T in Step S39 of FIG. 7B. Even when the image quality adjustment operation shifts from the transfer voltage correction operation to the density correction operation, the unit time U is maintained at 10 seconds set in the initial setting operation (YES in S53). The CPU 301 updates the displayed required time D based on the remaining adjustment time T predicted again. As shown in Table 10, when the remaining adjustment time T is one of 10 seconds to 1 second, "10 seconds" is displayed on the display 334. When the density correction operation is ended, the remaining adjustment time T and the displayed required time D both become 0 seconds. Then, the CPU 301 ends the adjustment time display operation.

According to the embodiment, the transfer voltage correction executed first is displayed with a coarse resolution, and the density correction executed subsequently is also displayed with a coarse resolution. According to the embodiment, the resolutions of the remaining adjustment times are unified, which prevents the user from being confused due to a change in resolution.

The above-mentioned method of displaying the remaining adjustment time when the image quality adjustment operations are executed sequentially may be appropriately switched by the user.

As described above, the remaining adjustment time is displayed with a coarse resolution when the image quality adjustment operation involving a retry operation is executed, while the remaining adjustment time is displayed with a fine resolution when the image quality adjustment operation involving no retry operation is executed. With this configuration, even when an actual image quality adjustment time increases due to the retry operation, the remaining adjustment time displayed on the display 334 is not decreasing, which can reduce an occurrence of the user's error in grasping a timing at which a job is to be restarted. This reduces the occurrence of the user's error in grasping the timing to collect the output product. This contributes to the improvement in usability.

According to the above-mentioned embodiments, the resolution of the displayed required time can be changed based on the type of image quality adjustment.

In the above-mentioned embodiments, the image forming apparatus 100 is described by taking the electrophotographic color copying machine as an example, but the present invention is not limited thereto. The present invention may be applied to, for example, an electrophotographic printer (for example, color laser beam printer or color LED printer), a multifunction peripheral (MFP), a facsimile apparatus, and a printing machine. The present invention may further be applied to not only a color image forming apparatus but also an image forming apparatus configured to form a monochrome image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-251690, filed Dec. 24, 2015, which is hereby incorporated by reference herein in its entirety.

What is claimed is:

1. An image forming apparatus, comprising:
   an image forming unit configured to form an image on a sheet;
   an adjustment unit configured to select a type of adjustment processing to be executed for the image forming unit from among a plurality of types of adjustment processing, and to execute the selected type of adjustment processing for the image forming unit;
   a determination unit configured to determine a required time of the selected type of adjustment processing; and
   a display unit configured to display a remaining time to be taken until the selected type of adjustment processing finishes being executed based on the required time,
   wherein the display unit counts down the remaining time,
   wherein the display unit controls a resolution of the remaining time based on the selected type of adjustment processing,
   wherein the plurality of types of adjustment processing includes a first type of adjustment processing and a second type of adjustment processing,
   wherein the first type of adjustment processing is executed again if the first type of adjustment processing fails,
   wherein the second type of adjustment processing is not executed again if the second type of adjustment processing fails,
   wherein the resolution includes a first resolution corresponding to the first type of adjustment processing and a second resolution corresponding to the second type of adjustment processing, and
   wherein the second resolution is finer than the first resolution.

2. The image forming apparatus according to claim 1, wherein, in a case where the adjustment unit sequentially executes at least two types of adjustment processing among the plurality of types of adjustment processing, the display unit changes the resolution of the remaining time based on each type of the at least two types of adjustment processing.

3. The image forming apparatus according to claim 2, wherein the display unit displays the remaining time based on the resolution and a total value of required times of the at least two types of adjustment processing.

4. The image forming apparatus according to claim 2,
   wherein the determination unit determines the required time each time one type of adjustment processing among the at least two types of adjustment processing is finished, and
   wherein the display unit displays the remaining time based on the required time determined again.

5. The image forming apparatus according to claim 2, wherein, in a case where the at least two types of adjustment processing include a first type of adjustment processing having a possibility that readjustment is executed, the display unit displays the remaining time with a first resolution coarser than a second resolution of a second type of adjustment processing having no possibility that readjustment is executed.

6. The image forming apparatus according to claim 1, wherein the resolution comprises a unit time; and
   the unit time is subtracted from the remaining time displayed on the display unit each time the unit time elapses.

7. The image forming apparatus according to claim 1, wherein, in a case where a predetermined execution condition is satisfied during the image forming operation, the adjustment unit suspends an image forming operation to start a type of adjustment processing for which the predetermined execution condition is satisfied among the plurality of types of adjustment processing, and restart the image forming operation after the type of adjustment processing is ended.

* * * * *